Dec. 26, 1961 A. B. GRAHAM ETAL 3,014,269
MANUFACTURE OF HOLLOW TURBINE BLADES
Filed Oct. 11, 1956
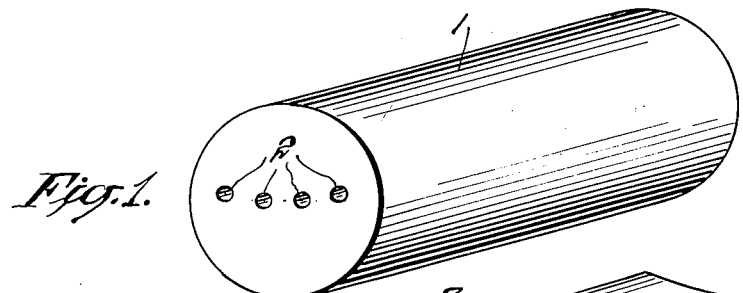
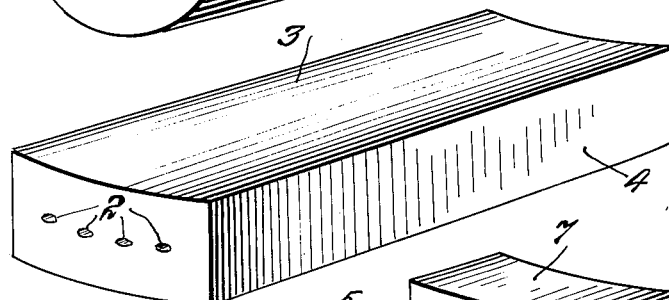
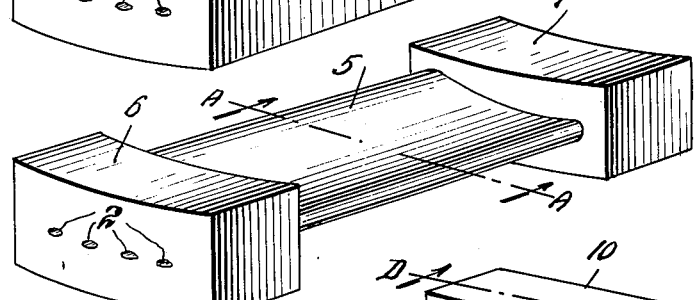
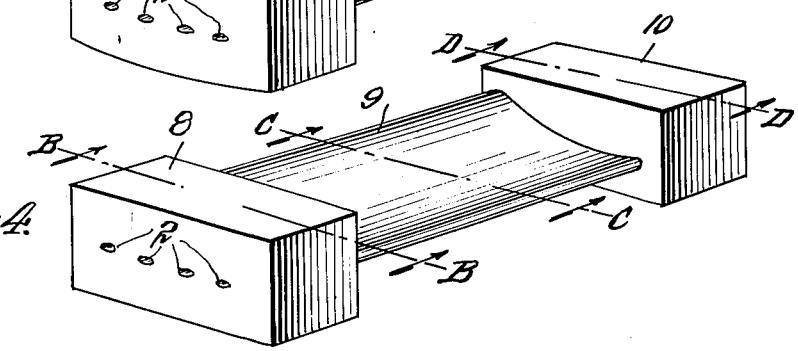
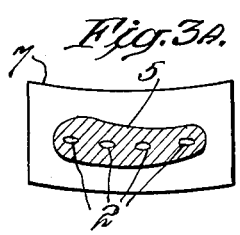 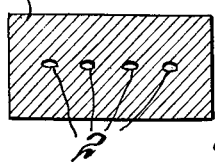  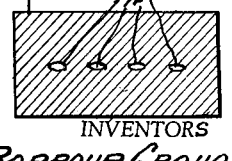
INVENTORS
ALEXANDER BARBOUR GRAHAM
CAMPBELL CLOUSTON HORNE
BY
ATTORNEY

United States Patent Office 3,014,269
Patented Dec. 26, 1961

3,014,269
MANUFACTURE OF HOLLOW TURBINE BLADES
Alexander Barbour Graham and Campbell Clouston Horne, Glasgow, Scotland, assignors to The International Nickel Company, Inc., New York, N.Y., a corporation of Delaware
Filed Oct. 11, 1956, Ser. No. 615,289
Claims priority, application Great Britain Oct. 20, 1955
2 Claims. (Cl. 29—156.8)

The present invention relates to the production of hollow turbine blades and, more particularly, to the production of hollow turbine blades which have variations in cross section and cross-sectional area at different points along the blade structure.

It is known that if one or more holes are made in a metallic body and filled with an appropriate material and the body is then hot worked by extrusion or forging, the filler material will flow with the metal. If the filler can be removed by any process which does not affect the metal, the hot-worked body or sections cut from it will still contain holes after the removal of the filler material but the size and shape of these will depend on the change which has taken place in the external dimensions of the body. This process can be utilized with advantage in the production of turbine blades adapted to be subjected to the conditions prevailing in a gas stream of high temperature. By maintaining the size, shape and positions of the holes within the blade profile, they can serve as passages for the conduction of a cooling medium, such as air, and thus will enable the blades to be used in gas streams of higher temperatures than would otherwise be possible.

No great difficulty arises in blade section of uniform cross section in running lengths with one or more passages extending throughout the length. The process than involves first making and filling a number of axial holes in a billet. Next, the billet is raised to extrusion temperature, placed in the container of an extrusion press and rotated so that the holes are correctly oriented with respect to a die of suitable section, which is usually an aerofoil section rather thicker than the desired final section. The billet is then extruded and the extruded section still containing filler is hot rolled through shaped rolls to reduce the thickness. Finally, the section is cut to lengths and the filler is removed.

Difficulties arise, however, when the cross section of the blade is not uniform throughout. Thus, in a rotor blade it is necessary to provide a root for attachment of the blade to a rotor disc and possibly also to provide a shroud at the free end and the section of the blade proper may have to vary both in shape and size throughout its length. A known method of producing solid moving blades is to forge a blank of circular cross section to form a root, a blade of the desired profile having change of camber and taper, and a shroud at the tip of the blade profile if so desired. The blank usually consists of a shank lying between two heads, the latter having a greater cross-sectional area than the former and all having circular profiles. Now, if such a blank contains holes which are filled with an appropriate filler material, the resultant blade will still contain holes but they will be irregular in cross-sectional area and are liable to show wide variations from root to tip. This is an inevitable result of forging which, however, is required when the cross section is not uniform throughout the length of the blade. Although many attempts were made to overcome the foregoing difficulties and other disadvantages, none, as far as we are aware, was entirely successful when carried into practice commercially on an industrial scale.

It has now been discovered that by a novel forging and machining process a hollow turbine blade of non-uniform cross section may be produced having at least one hole or passage therein of substantially uniform cross-sectional area throughout the length of the blade.

It is an object of the present invention to provide a process by means of which one skilled in the art may produce a turbine blade of non-uniform cross section containing at least one passage having a cross-sectional area substantially uniform throughout the length of the blade.

Another object of the invention is to provide a process for producing a turbine blade of non-uniform cross section having an integral root and/or shroud, said turbine blade containing at least one passage having a cross-sectional area substantially uniform throughout the length of the blade.

Other objects and advantages will become apparent from the following description taken in conjunction with the accompanying drawing in which:

FIG. 1 shows a billet containing filled holes or passages suitable for producing a turbine blade;

FIG. 2 depicts a filled billet after extrusion;

FIG. 3 shows the extruded filled billet after the blade shank has been machined;

FIG. 3a illustrates a cross section of the machined blade shank at A—A;

FIG. 4 is a view of the completed forged blade with an integral root and shroud; and FIGS. 4A, 4B and 4C depict cross sections of the completed blade at B—B, C—C and D—D, respectively.

Generally speaking, the present invention contemplates a process for the production of hollow turbine blades of non-uniform cross section which comprises subjecting a turbine blade blank having a blade portion containing at least one filled hole of uniform transverse cross-sectional area over the length of the blade portion to a machining operation to provide a blade portion or shank different in shape from the final blade but having a configuration wherein any section thereof has approximately the transverse cross-sectional area of the final blade at a corresponding section and forging the machined blank to final blade configuration while retaining the same transverse cross-sectional area in the blade proper. During the machining operation, care must be taken that the filling material is not exposed. When the forging is completed, the filling material is removed from the formed blade by any convenient method in order to open the holes or passages in the turbine blade. Forging may alter the shape and position of the passage or passages in the blade proper but the cross-sectional area of the passage will remain substantially uniform. The turbine blade blank containing filled holes may be formed from a billet of heat-resisting metal or may be itself a section of extruded stock which contains filled holes.

In producing a hollow turbine blade with a root and a plurality of axial holes, a blank with filled parallel axial holes extending through said blank and of approximately the cross-sectional area required for the root of the blade is machined over the length of the blade proper so that it has approximately the desired final transverse cross-sectional area at each point along its length and then is forged to the final shape.

The invention is of particular value in the production of blades in which the passages must occupy different relative positions in the root and blade. Thus, the passages may have to lie in a narrow straight band across the root and in a curved band across the blade proper and indeed to follow the curved, twisted and perhaps tapered form of the aerofoil section of the blade. The course of the passages may, therefore, have to change as they enter the root from the blade and to vary somewhat in the blade. These changes are made by the stamping operation contemplated by the present invention and cannot be made by machining.

In carrying out the invention to provide a blade having a root, the blank can be made by extruding a cylindrical billet provided with a number of filled axial holes lying on an arc of a circle and themselves of circular cross section. The billet is raised to extrusion temperature, placed in the container of an extrusion press, and rotated, if necessary, so that the holes are correctly oriented with respect to a die of suitable section. The die has an orifice of area near to that of the root section and of more or less rectangular shape but preferably with two opposed sides arcuate similarly to the pitch line of the holes, i.e., the arc in which the holes lie. The billet is extruded through this die with the result that the holes are deformed to a pseudo-elliptical shape and still lie on an arc. The bar is then cut into blanks and the central portion of each is machined to a shank. As described hereinbefore, the shape of this shank is dependent on the shapes which the passages are desired to have with the total volume being equal to the volume of the final blade proper. If a shroud is required as well as a root, both ends of the blank can be left at the original shape.

The blank is next forged by hot pressing in a die to produce a shroud and root of rectangular cross section, a blade having taper and change of camber. In this operation, the shape of the holes in the blade will change in accordance with the change in shape of the blade section and the holes in the root and shroud will be brought to lie in a straight line instead of an arc.

Finally, the blade is given any thermal treatment necessary and the filler is removed. If the final root should be of so-called fir-tree shape, it may be machined.

In carrying the invention into practice, it is preferred to produce a turbine blade blank by a process of extrusion. Referring now to the drawing, FIG. 1, depicts a cylindrical billet 1 of heat resistant metal containing filled holes 2 of circular cross section. Axial holes 2 are drilled parallel to the axis of the billet. Preferably, holes 2 are blind holes whose centres are pitched on an arc, as shown in FIG. 1. The billet is raised to extrusion temperature, placed in the container of the extrusion press, rotated to correctly orient the filled holes of the billet with respect to the die and extruded in an extrusion press through a die having a more or less rectangular shape and having two opposite sides arcuate in a fashion similar to the arcuate pitch line of the holes in the billet. The extruded billet is cut into lengths to provide turbine blade blanks having axial holes extending therethrough. FIG. 2 depicts such an extruded turbine blade blank having continuous end-to-end holes 2 with a pseudo-elliptical shape lying on an arc. Sides 3 of the extruded blank 4 have the desired arcuate configuration while, at the same time, blank 4 contains filled holes 2 which extend axially through the entire section, i.e., extend parallel to the axis. The blade blank is machined to form a blade shank 5, a root section 6 and a shroud section 7, which are depicted in FIG. 3. When producing blade shank 5 by any of the known machining processes, the filling material should not break out and be exposed other than at the extremities of the blade blank. A typical section of the blade shank 5 is depicted in FIG. 3A. It is important that at any given point along the length of the machined blade blank the cross-sectional area should be substantially identical to the cross-sectional area at the corresponding point on the completed blade so that the total volume of the shank is equal to the total volume of the blade proper in the completed blade. After the machining is completed, the blade blank containing the filled holes is stamped or hot pressed between dies to form the completed blade configuration of the same total volume. FIG. 4 shows such a completed blade configuration with root 8, blade proper 9 and shroud 10. FIGS. 4A and 4C show the rectangular cross sections of the root and the shroud, respectively, while FIG. 4B shows a cross section of the blade proper. Filled holes 2 are in such instance completely surrounded by the metal of the blade. In each of the cross sections, the filled holes 2 may themselves vary in cross section but at all points they will be substantially identical in cross-sectional area.

The invention allows the shape of the passages to be more easily controlled than hitherto. If, for instance, the passages should be circular in the blade and pseudo-elliptical in the root, a round billet containing round holes is extruded to pseudo-elliptical section and is subsequently so machined that the major transverse axis of the pseudo-elliptical holes in the shank is oriented in the direction of pressing. The forging operation will cause them to revert to circular cross section. By suitably selecting the reduction in thickness of the root, the passages in it are rendered pseudo-elliptical during the pressing.

After completion of the forging or hot pressing operation, the blade is given any thermal treatment necessary and the filler material is removed from the heat resistant metal by any convenient method. Either prior or subsequent to removal of the filler material, the root may be machined to the so-called fir-tree shape. It is within the contemplation of this invention to utilize any suitable filler material in combination with any metal suitable for the manufacture of turbine blades adapted to be subjected to conditions prevailing in gas turbines. Relative deformability and ease of removal are the criteria which determine whether a particular filler material is suitable for use with any particular machinable heat resistant metal, as is well known to those skilled in the art. Preferably, when a machinable heat resistant metal such as nickel-chromium alloy is used to form the turbine blade, a known ferritic, titanium-containing manganese steel or a known mixture of metal and ceramic powders, e.g., iron-magnesia, may be used as the filler material. Such filler materials are disclosed in the co-pending Hignett U.S. application Serial No. 472,755 and the Betteridge U.S. application Serial No. 509,380. These types of filler materials may be leached out of the filled holes by means of aqueous mineral acid solutions without damaging the formed turbine blades. By varying the compositions of the titanium-containing, ferritic manganese steels and of the metal ceramic powders, it is possible to obtain specific materials which will match the hot deformability of the machinable heat resistant metals conventionally used in the manufacture of gas turbine blades. It is to be noted that the term nickel-chromium alloy refers to nickel-chromium alloys which may also contain cobalt, iron, molybdenum, tungsten, titanium, niobium, tantalum, aluminium, zirconium and boron and minor amounts of impurities normally associated therewith.

For the purpose of giving those skilled in the art a better understanding of the invention and/or a better appreciation of the advantages of the invention, the following example embodying the concepts of the present invention is given:

EXAMPLE

Billet: a right cylinder of nickel-chromium base alloy.

*Composition*

| | Percent |
|---|---|
| Carbon | 0.1 max. |
| Titanium | 1.8–2.7 |
| Chromium | 18–21 |
| Aluminium | 0.5–1.8 |
| Silicon | 1.0 max. |
| Manganese | 1.0 max. |
| Iron | 5.0 max. |
| Cobalt | 2.0 max. |
| Nickel | Balance |

Size: 4″ dia., 6″ long. (See FIG. 1.)

4 holes. 7/32″ dia., 5″ deep filled with filler rod of composition:

| | |
|---|---|
| Titanium | 1–10 |
| Manganese | 5–20 |
| Carbon | Less than 0.5 |
| Iron | Balance |

Extrude to bar form (FIG. 2) of more or less rectangular section, two opposite sides arcuate: 1.7" x 1.53".
Temperature of extrusion: 1170° C.
Cut out from extruded section a length of bar equal to 6".

*Machine*

| | Inches |
|---|---|
| Shank length | 4 |
| Shroud length | 0.5 |
| Root length | 1.5 |

(See FIG. 3.)

Mean section of shank (FIG. 3A) to lie between a section close to the root of 1.23" x 0.75" and a section close to the shroud of 1" x 0.54".
Stamp shank to aerofoil required: approx. mean chord 2".
Stamp shroud and root to rectangular section: 2" x 1".

The present invention is particularly applicable to the production of turbine blades which have non-uniform cross sections at varying points of the blade and which have at least one internal passage running substantially longitudinally therethrough, said passage having a substantially uniform cross-sectional area in the blade proper. The hollow turbine blades thus produced may have an integral root and/or shroud and the blade proper may have a variable pitch, camber or taper.

Although the present invention has been described in conjunction with the preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. A process for the production of a turbine blade having an integral root portion, shroud portion and blade portion and containing a plurality of substantially elongated interior passages of substantially uniform cross-sectional area running substantially parallel to the longitudinal axis of said blade, said passages opening on the end of said blank and said openings lying in a substantially straight line on said end, which comprises providing a turbine blade blank consisting of an elongated mass of heat resistant metal having a uniform cross section along its length, said cross section comprising a rectangle having two opposed sides arcuate and said mass of heat resistant metal containing a plurality of filled axial holes extending through the mass, the ends of which holes lie on a pitch line similar to and parallel to the pitch line of the opposed sides of the cross section, machining said turbine blade blank to an approximate blade configuration so that the transverse cross-sectional area at any given point on the blade blank is substantially identical to the transverse cross-sectional area of the finished blade at the corresponding point of said finished blade, forging said formed blade blank to final configuration wherein the root and shroud portions attain a rectangular cross section while maintaining the transverse cross-sectional area at any particular point along the length of the blade substantially the same as the corresponding transverse cross-sectional area on the machined blade blank and subsequently removing the filler material from the finished blade.

2. A process as set forth and described in claim 1 wherein the uniform section of the turbine blade blank is produced by extruding a billet of heat resistant metal which contains a plurality of filled axial circular holes lying in transverse section on an arc of a circle through a rectangular die having opposed sides arcuate similarly to the pitch line of the holes.

References Cited in the file of this patent

UNITED STATES PATENTS

| 1,910,943 | Wiberg | May 23, 1933 |
| 2,013,622 | Bedford | Sept. 3, 1935 |
| 2,047,555 | Gardner | July 14, 1936 |
| 2,312,094 | Harmon | Feb. 23, 1943 |
| 2,328,348 | Lampton | Aupg. 31, 1943 |
| 2,628,417 | Peyches | Feb. 17, 1953 |
| 2,759,246 | Campbell | Aug. 21, 1956 |
| 2,763,919 | Kempe | Sept. 25, 1956 |
| 2,836,884 | Graham | June 3, 1958 |

FOREIGN PATENTS

| 958,272 | France | Sept. 12, 1949 |